US009619389B1

(12) United States Patent
Roug

(10) Patent No.: US 9,619,389 B1
(45) Date of Patent: Apr. 11, 2017

(54) SYSTEM FOR A BACKWARD AND FORWARD APPLICATION ENVIRONMENT COMPATIBLE DISTRIBUTED SHARED COHERENT STORAGE

(71) Applicant: UNIGEN Corporation, Fremont, CA (US)

(72) Inventor: Anton Roug, Fremont, CA (US)

(73) Assignee: UNIGEN CORPORATION, Fremont, CA (US)

( * ) Notice: Subject to any disclaimer, the term of this patent is extended or adjusted under 35 U.S.C. 154(b) by 321 days.

(21) Appl. No.: 14/328,586

(22) Filed: Jul. 10, 2014

Related U.S. Application Data

(60) Provisional application No. 61/844,997, filed on Jul. 11, 2013.

(51) Int. Cl.
*G06F 12/0831* (2016.01)
*G06F 12/0811* (2016.01)
*G06F 13/42* (2006.01)
*H04L 29/08* (2006.01)

(52) U.S. Cl.
CPC ...... *G06F 12/0835* (2013.01); *G06F 12/0811* (2013.01); *G06F 13/426* (2013.01); *H04L 67/1097* (2013.01)

(58) Field of Classification Search
CPC .............. H04L 9/356; H04L 67/1097
See application file for complete search history.

(56) References Cited

U.S. PATENT DOCUMENTS

| 6,098,128 | A | 8/2000 | Velez-McCaskey et al. |
| 6,304,942 | B1 | 10/2001 | DeKoning |
| 6,834,326 | B1 | 12/2004 | Wang et al. |
| 7,409,497 | B1 | 8/2008 | Kazar et al. |
| 7,454,566 | B1 | 11/2008 | Overby |
| 2002/0161846 | A1 | 10/2002 | Ulrich et al. |
| 2003/0188097 | A1 | 10/2003 | Holland et al. |
| 2004/0024963 | A1 | 2/2004 | Talagala et al. |
| 2004/0148459 | A1 | 7/2004 | Ali et al. |
| 2005/0114596 | A1 | 5/2005 | Golding |
| 2005/0132212 | A1 | 6/2005 | Haswell |
| 2008/0114931 | A1 | 5/2008 | Aoki |
| 2009/0106492 | A1 | 4/2009 | Muto et al. |
| 2014/0359044 | A1* | 12/2014 | Davis ............... H04L 45/60 709/213 |

* cited by examiner

*Primary Examiner* — Zachary K Huson

(57) ABSTRACT

A method for implementing a storage architecture on a storage board is disclosed. The method comprises enabling the storage board on a first application node of an application server in a shared network comprising a plurality of application nodes and a plurality of storage nodes. The method also comprises processing a read or write request from an application on the first application node and profiling data transmitted in the request to determine the manner in which to process the request. Further, the method comprises accessing one of a plurality of tiers of storage media to perform a read or write responsive to the request, wherein each tier of storage media can be distributed over multiple nodes. Finally, the method comprises updating a first cache based on a configuration policy and maintaining coherency between shared data in the first cache and caches implemented on other storage boards in the network.

20 Claims, 15 Drawing Sheets

Persistent Data – as represent in MD store or MD cache

⟨I⟩ Invalid – block not in use
⟨#⟩ Valid – block sequence number
⟨L⟩ Locked – block being update – state can be augmented by STP
⟨Q⟩ Write queued
⟨E⟩ Exclusive – block valid – no other nodes have cached the MD
⟨S⟩ Shared – block valid – other nodes have cached MD Cache Data ⟨I⟩ Invalid – block not in use
⟨#⟩ Valid – block sequence number
⟨R⟩ Requested data from persistent store
⟨Q⟩ Read queued — Note: a read of cache can return invalid at any time if the cache device supports TRIM

FIG. 6A

SYSTEM FOR A BACKWARD AND FORWARD APPLICATION ENVIRONMENT COMPATIBLE DISTRIBUTED SHARED COHERENT STORAGE

CROSS REFERENCE TO RELATED APPLICATIONS

This application is a conversion of and claims priority to and the benefit of Provisional Patent Application No. 61/844,997, entitled "A SYSTEM FOR A BACKWARD AND FORWARD APPLICATION ENVIRONMENT COMPATIBLE DISTRIBUTED SHARED COHERENT STORAGE" having a filing date of Jul. 11, 2013, naming Anton Roug as the inventor, which is herein incorporated by reference in its entirety.

FIELD OF THE INVENTION

Embodiments according to the present invention generally relate to storage systems and more particularly to distributed storage systems.

BACKGROUND OF THE INVENTION

Traditional data center storage is typically deployed using multiple types of storage media. FIG. 1 illustrates a traditional storage architecture with associated storage media. A traditional storage architecture can comprise of one or more application nodes (e.g., application node 1 40A to application node n 40N). Storage media elements 3 and 5, which can include solid state storage and rotating media (hard disk drives), are examples of type of storage media deployed in traditional data center storage.

In a traditional storage architecture, as illustrated in FIG. 1, all the storage processing and caching operations are performed by the storage processing and cache module 1 typically in software that runs on an application node operating system or hypervisor implemented on an application node processor 12. The storage processing module 1 controls local storage media, e.g., storage media 3 through a storage Host Bus Adapter (HBA), which typically utilizes standard storage media including SATA, SAS, Fiber channel and is evolving to the standard PCIe architectures including AHCI, NVM Express (NVMe), SCSI-Express architectures, or the PCIe solid state storage architectures that do storage processing on a standard storage network 11. The storage network 11 can use storage area network protocols including iSCSI, fiber channel, fiber channel over Ethernet (FCoE), NFS and CIFS to communicate with non-local storage media 5. Further, a traditional storage architecture can comprise an integrated fault tolerant SAN or NAS storage system 6 with integrated storage media 5 that delivers storage data processing over the storage area network using the aforementioned storage network protocols.

The challenge with traditional storage architectures is that the storage processing and cache module 1 runs on the application node and, therefore, has to contend for resources with other application processing that is also being performed on the node from other applications. The overhead created by the storage processing and cache module 1 on the application node processor results in an inability to control performance and latency because of resource conflicts with other applications also processing on the application node. Further, the current block and file protocols that are used over the storage area network, e.g., fiber channel, iSCSI, etc. are inefficient and less reliable.

Additionally, reliability in traditional storage networks is limited to only point-to-point communication over the block (SAN) or file (NAS) storage network. For example, an application node is typically connected to one SAN or NAS and there is limited ability to distribute data across multiple SANs or NASs. In other words, one application node is typically tied to one SAN or NAS and there is limited ability to scale. As a result, there is limited ability to build a deployment starting with a smaller deployment (e.g., one application node and one storage node) and grow the system incrementally as application nodes and storage nodes are added.

BRIEF SUMMARY OF THE INVENTION

Accordingly, a need exists for a method of implementing shared block storage that scales directly as a self-contained system as application nodes and storage nodes are added. Further, a need exists for a storage architecture wherein the storage processing and caching can be performed on a dedicated processor running on an optimized storage board in the application node instead of directly on the application node processor.

Using the beneficial aspects of the systems described, without their respective limitations, embodiments of the present invention provide novel solutions to the challenges inherent in implementing storage architectures.

Embodiments of the present invention address the issues in traditional architectures by providing a novel storage architecture comprising an integration of block based access with storage access processing on an optimized storage board, storage tier processing on the optimized storage board and storage device management on the storage board or storage node. In addition, the architecture provides vendor interoperability through an optimized distributed storage protocol.

In one embodiment, the present invention provides a method and apparatus for implementing shared block storage that scale directly as a self-contained system as application nodes and storage nodes are added. In another embodiment, the present invention provides a storage architecture wherein the storage processing and cache functions can be performed in optimized storage software on an optimized storage board in the application node. Alternatively, in one embodiment, the storage processing and cache functions are performed on a standard server board or optimized storage board in a dedicated storage node.

In one embodiment, the present invention provides a system and method for shared coherent storage for a distributed datacenter storage system. In one embodiment, the present invention implements a shared, reliable, low latency, file and block memory storage system used in a typical datacenter deployment with multiple application servers interconnected through a high speed interconnect. In one embodiment, the storage architecture of the present invention enables application environment backward compatibility of a high performance and coherent shared storage using a hardware optimized high performance interconnect and hardware optimized reliable encoding.

In one embodiment, a system for implementing a storage architecture on a storage board is presented. The system comprises the storage board, wherein the storage board is deployed on a first application node of an application server in a shared network comprising a plurality of application nodes and a plurality of storage nodes. The method also comprises a storage access processing module operable to process a read or write request from an application on the first application node and profile data transmitted in the request to determine the manner in which to process the request. Further, the method comprises a storage tier processing module operable to access one of a plurality of tiers of storage media to perform a read or write responsive to the request, wherein each tier of storage media can be distributed over multiple application nodes or multiple storage nodes. The method, additionally, comprises a first cache operable to be updated by the storage access processing module based on a configuration policy. Finally, the method comprises a cache management module operable to maintain coherency of shared data between the first cache and caches implemented on respective storage boards in the plurality of application nodes.

In another embodiment, a system for implementing a storage architecture on a storage board is disclosed. The system comprises a storage board enabled on a first application node of an application server in a shared network comprising a plurality of application nodes and a plurality of storage nodes. The system also comprises a storage access processing module operable to process a read or write request from an application on the first application node and profile data transmitted in the request to determine the manner in which to process the request. Further, the system comprises a storage tier processing module operable to access one of a plurality of tiers of storage media to perform a read or write responsive to the request, wherein each tier of storage media can be distributed over multiple application nodes or multiple storage nodes. In addition the system comprises a first cache operable to be updated by the storage access processing module based on a configuration policy. Finally, a system comprises a cache management module operable to maintain coherency of shared data between the first cache and caches implemented on respective storage boards in the plurality of application nodes.

In a different embodiment, a microprocessor that implements a storage architecture on a storage board is disclosed. The microprocessor comprises a storage access processing module operable to process a read or write request from an application on a first application node and profile data transmitted in the request to determine the manner in which to process the request, wherein the storage board is enabled on the first application node of an application server in a shared network comprising a plurality of application nodes and a plurality of storage nodes. The microprocessor also comprises a storage tier processing module operable to access one of a plurality of tiers of storage media to perform a read or write responsive to the request, wherein each tier of storage media can be distributed over multiple application nodes or multiple storage nodes. Further, the processor comprises a first cache operable to be updated by the storage access processing module based on a configuration policy. Finally, it comprises a cache management module operable to maintain coherency of shared data in the first cache with caches implemented on respective storage boards in the plurality of application nodes.

The following detailed description together with the accompanying drawings will provide a better understanding of the nature and advantages of the present invention.

BRIEF DESCRIPTION OF THE DRAWINGS

Embodiments of the present invention are illustrated by way of example, and not by way of limitation, in the figures of the accompanying drawings and in which like reference numerals refer to similar elements.

FIGS. 6A, 6B, 6C and 6D illustrate examples of a state machine used by the storage architecture for implementing shared namespace coherence across multiple nodes.

DETAILED DESCRIPTION OF THE INVENTION

Figure 1:
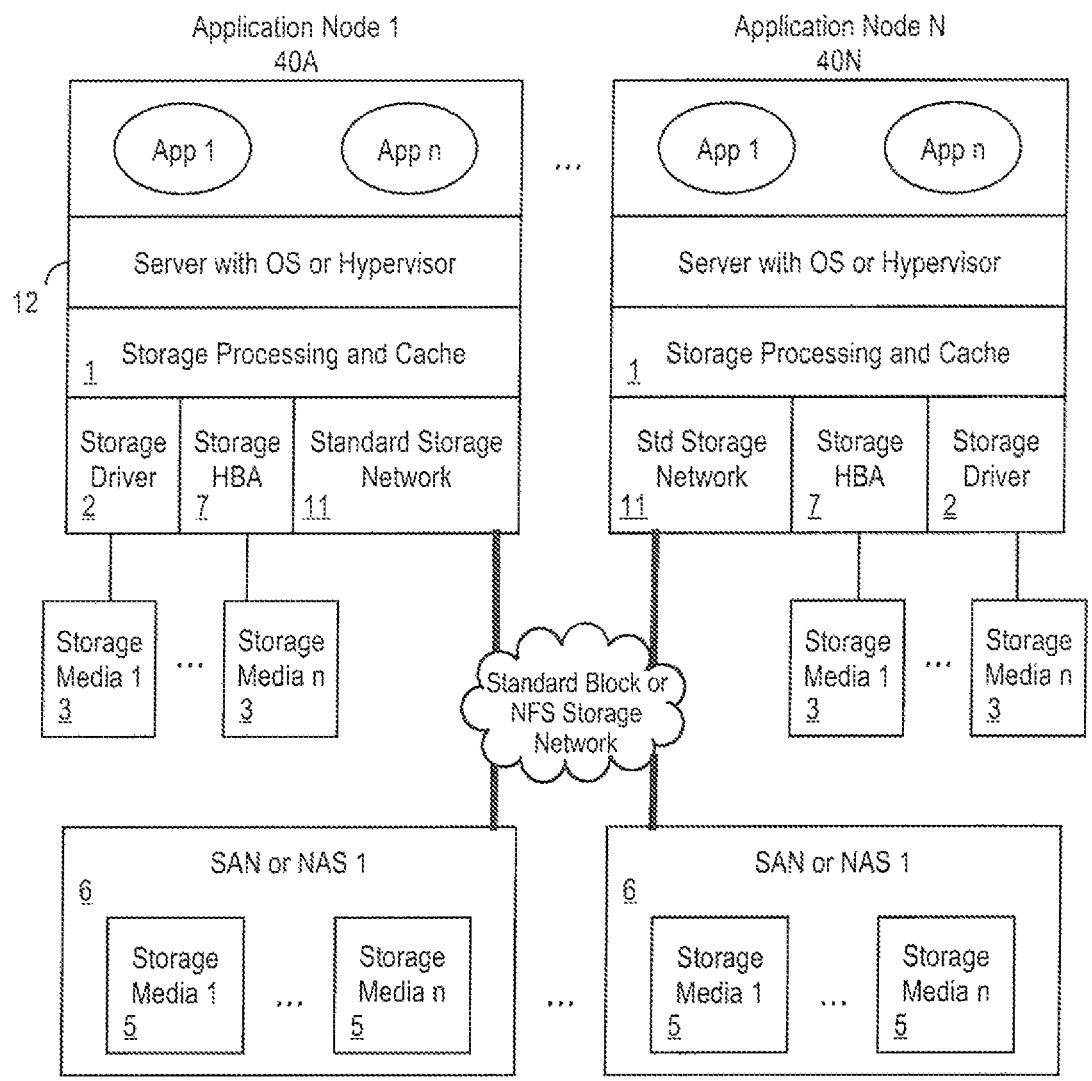
FIG. 1 illustrates a traditional storage architecture with associated storage media.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Notation and Nomenclature

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "enabling," "processing," "profiling," "accessing," "updating," "maintaining" "performing," "determining," or the like, refer to actions and processes (e.g., flowchart 800 of FIG. 8) of a computer system or similar electronic computing device or processor (e.g., system 210 of FIG. 2). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

Figure 2:
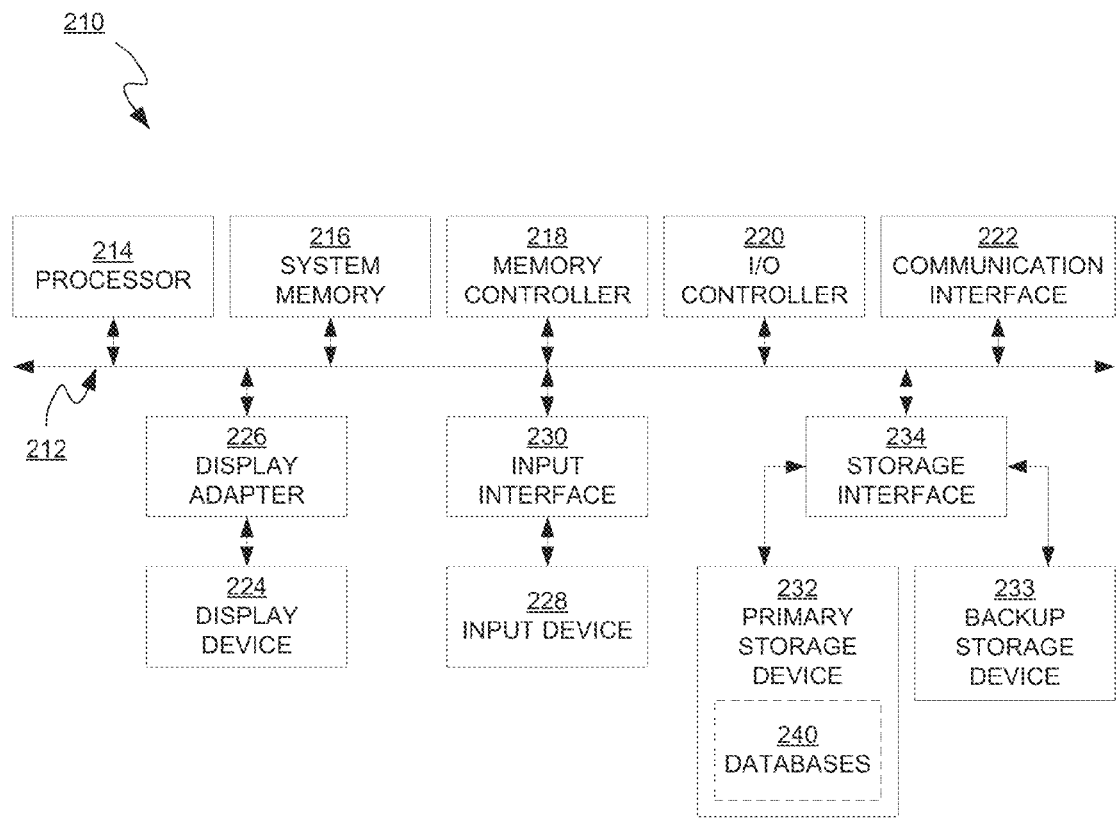
FIG. 2 is an exemplary computer system using a storage architecture in accordance with embodiments of the present invention.

FIG. 2 is an exemplary computer system 210 using a storage architecture in accordance with embodiments of the present invention. Computing system 210 broadly represents any single or multi-processor computing device or system capable of executing computer-readable instructions. Examples of computing system 210 include, without limitation, workstations, laptops, client-side terminals, servers, distributed computing systems, handheld devices, or any other computing system or device. In its most basic configuration, computing system 210 may include at least one processor 214 of an embodiment of the present invention and a system memory 216.

Processor 214 incorporates embodiments of the present invention and generally represents any type or form of processing unit capable of processing data or interpreting and executing instructions. In certain embodiments, processor 214 may receive instructions from a software application or module. These instructions may cause processor 214 to perform the functions of one or more of the example embodiments described and/or illustrated herein. In one embodiment, processor 214 may be an out of order microprocessor. In a different embodiment, processor 214 may be a superscalar processor. In yet another embodiment, processor 214 may comprise multiple processors operating in parallel.

System memory 216 generally represents any type or form of volatile or non-volatile storage device or medium capable of storing data and/or other computer-readable instructions. Examples of system memory 216 include, without limitation, RAM, ROM, flash memory, or any other suitable memory device. Although not required, in certain embodiments computing system 210 may include both a volatile memory unit (such as, for example, system memory 216) and a non-volatile storage device (such as, for example, primary storage device 232).

Computing system 210 may also include one or more components or elements in addition to processor 214 and system memory 216. For example, in the embodiment of FIG. 2, computing system 210 includes a memory controller 218, an input/output (I/O) controller 220, and a communication interface 222, each of which may be interconnected via a communication infrastructure 212. Communication infrastructure 212 generally represents any type or form of infrastructure capable of facilitating communication between one or more components of a computing device. Examples of communication infrastructure 212 include, without limitation, a communication bus (such as an Industry Standard Architecture (ISA), Peripheral Component Interconnect (PCI), PCI Express (PCIe), or similar bus) and a network.

Memory controller 218 generally represents any type or form of device capable of handling memory or data or controlling communication between one or more components of computing system 210. For example, memory controller 218 may control communication between processor 214, system memory 216, and I/O controller 220 via communication infrastructure 212.

I/O controller 220 generally represents any type or form of module capable of coordinating and/or controlling the input and output functions of a computing device. For example, I/O controller 220 may control or facilitate transfer of data between one or more elements of computing system 210, such as processor 214, system memory 216, communication interface 222, display adapter 226, input interface 230, and storage interface 234.

Communication interface 222 broadly represents any type or form of communication device or adapter capable of facilitating communication between example computing system 210 and one or more additional devices. For example, communication interface 222 may facilitate communication between computing system 210 and a private or public network including additional computing systems. Examples of communication interface 222 include, without limitation, a wired network interface (such as a network interface card), a wireless network interface (such as a wireless network interface card), a modem, and any other suitable interface. In one embodiment, communication interface 222 provides a direct connection to a remote server via a direct link to a network, such as the Internet. Communication interface 222 may also indirectly provide such a connection through any other suitable connection.

Communication interface 222 may also represent a host adapter configured to facilitate communication between computing system 210 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 222 may also allow computing system 210 to engage in distributed or remote computing. For example, communication interface 222 may receive instructions from a remote device or send instructions to a remote device for execution.

As illustrated in FIG. 2, computing system 210 may also include at least one display device 224 coupled to communication infrastructure 212 via a display adapter 226. Display device 224 generally represents any type or form of device capable of visually displaying information forwarded by display adapter 226. Similarly, display adapter 226 generally represents any type or form of device configured to forward graphics, text, and other data for display on display device 224.

As illustrated in FIG. 2, computing system 210 may also include at least one input device 228 coupled to communication infrastructure 212 via an input interface 230. Input device 228 generally represents any type or form of input device capable of providing input, either computer- or human-generated, to computing system 210. Examples of input device 228 include, without limitation, a keyboard, a pointing device, a speech recognition device, or any other input device.

As illustrated in FIG. 2, computing system 210 may also include a primary storage device 232 and a backup storage device 233 coupled to communication infrastructure 212 via a storage interface 234. In one embodiment, storage interface 234 may be a self-contained storage board with a dedicated processor for performing storage processing operations and cache functions. Storage devices 232 and 233 generally represent any type or form of storage device or medium capable of storing data and/or other computer-readable instructions. For example, storage devices 232 and 233 may be a magnetic disk drive (e.g., a so-called hard drive), a floppy disk drive, a magnetic tape drive, an optical disk drive, a flash drive, or the like. Storage interface 234 generally represents any type or form of interface or device for transferring data between storage devices 232 and 233 and other components of computing system 210.

In one example, databases 240 may be stored in primary storage device 232. Databases 240 may represent portions of a single database or computing device or it may represent multiple databases or computing devices. For example, databases 240 may represent (be stored on) a portion of computing system 210. Alternatively, databases 240 may represent (be stored on) one or more physically separate devices capable of being accessed by a computing device, such as computing system 210.

Continuing with reference to FIG. 2, storage devices 232 and 233 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 232 and 233 may also include other similar structures or devices for allowing computer software, data, or other computer-readable instructions to be loaded into computing system 210. For example, storage devices 232 and 233 may be configured to read and write software, data, or other computer-readable information. Storage devices 232 and 233 may also be a part of computing system 210 or may be separate devices accessed through other interface systems.

Many other devices or subsystems may be connected to computing system 210. Conversely, all of the components and devices illustrated in FIG. 2 need not be present to practice the embodiments described herein. The devices and subsystems referenced above may also be interconnected in different ways from that shown in FIG. 2. Computing system 210 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 210. All or a portion of the computer program stored on the computer-readable medium may then be stored in system memory 216 and/or various portions of storage devices 232 and 233. When executed by processor 214, a computer program loaded into computing system 210 may cause processor 214 to perform and/or be a means for performing the functions of the example embodiments described and/or illustrated herein. Additionally or alternatively, the example embodiments described and/or illustrated herein may be implemented in firmware and/or hardware.

A System for a Backward and Forward Application Environment Compatible Distributed Shared Coherent Storage In one embodiment, the present invention provides a method and apparatus for implementing shared block storage that scales directly as a self-contained system as application nodes and storage nodes are added. In another embodiment, the present invention provides a storage architecture wherein the storage processing and cache functions can be performed in optimized storage software on an optimized storage board in the application node. Alternatively, in one embodiment, the storage processing and cache functions are performed on a standard server board or optimized storage board in a dedicated storage node. Further, in one embodiment, the present invention provides a storage architecture wherein storage tier processing and storage device management can also be performed on the optimized storage board. In addition, the architecture of the present invention can also provide vendor interoperability through an optimized distributed storage protocol.

In one embodiment, the present invention provides a system and method for shared coherent storage for a distributed datacenter storage system. In one embodiment, the present invention provides a shared block storage system for a distributed datacenter storage system that scales efficiently and reliably and enables right sized storage capacity and performance by integrating standard storage media including persistent memory storage, solid stage storage and hard disk storage. In one embodiment, the present invention implements a shared, reliable, low latency, file and block memory storage system used in a typical datacenter deployment with multiple application servers interconnected through a high speed interconnect. In one embodiment, the storage architecture of the present invention enables application environment backward compatibility of a high performance and coherent shared storage using a hardware optimized high performance interconnect and hardware optimized reliable encoding.

As explained above, in traditional storage architectures, the storage processing and caching functions were performed on the same application node processor that also performed processing for all the other applications running on the application node. Embodiments of the present invention, however, advantageously perform the storage processing and caching functions using a dedicated storage board. In one embodiment, the present invention is a self-contained and hardware optimized storage board that presents itself to the application node as a block storage interface or persistent memory.

Self-Contained Storage Board

In one embodiment, the storage board is deployed on each application node that requires access to the shared storage. In one embodiment, each storage board provides a processing platform for plug-and-play (PAP) integration with an application node running one of any number of industry application platforms, PAP integration with storage media, PAP integration with storage networks, and optimized hardware acceleration of data transfer and software control of the system. In one embodiment, the PAP integration can be performed using NVMe or persistent memory.

Figure 3:
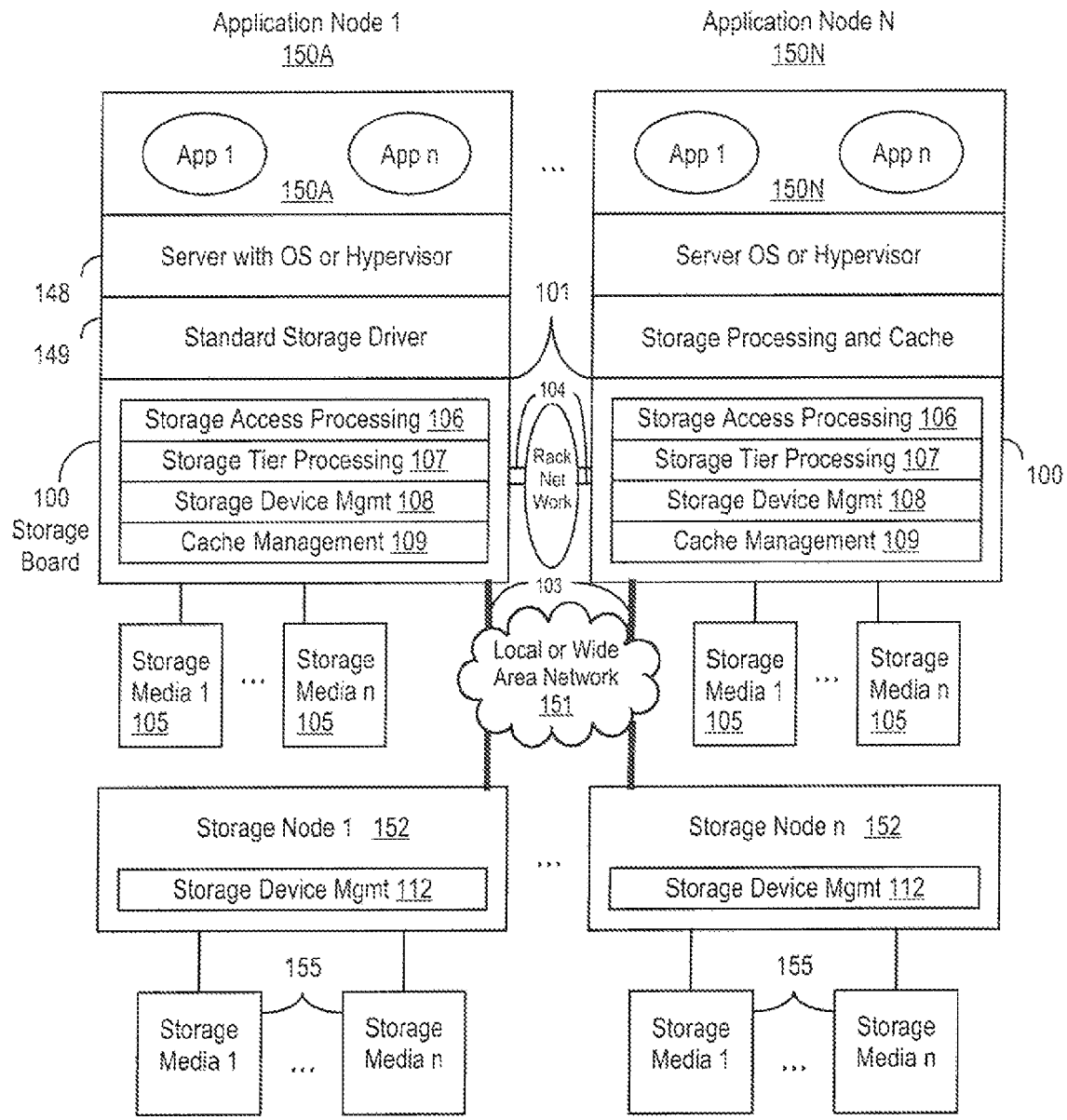
FIG. 3 illustrates a block diagram of a typical deployment of the distributed shared block storage system in accordance with an embodiment of the present invention.

FIG. 3 illustrates a typical deployment of the distributed shared block storage system in accordance with an embodiment of the present invention. As illustrated in FIG. 3, the network 151 connects one or more application nodes (e.g. 150A to 150N) and one or more storage nodes 152.

In one embodiment of the present invention, the application nodes can comprise one or more storage boards 100. In one embodiment, the storage boards 100 can manage one or more storage media devices 105, e.g., solid state device (SSD) storage devices. In one embodiment, the storage board 100 can communicate with an application node server or hypervisor 148 through a standard storage driver 149.

A storage board 100 can interface with the application node, e.g., 150A through a block storage interface 101. In one embodiment, this interface can be based on the PCIe protocol. In one embodiment, the PCIe interface can support: a) block storage standards based on the Advanced Host Controller Interface (AHCI), NVM Express (NVMe) or SCSI Express; b) a persistent memory non-transparent bus (PCIe G3) and memory bus (DDR3/DDR4); and c) industry network interface compatibility. In one embodiment, the PCIe interface can be implemented using an FPGA. In one embodiment, the storage board is a self-contained storage system that can plug into any system, and be accessed through the interface, e.g., NVMe. As compared to prior art methods where only single devices, e.g., SSDs would be available through an NVMe-type interface, embodiments of the present invention allow an entire storage system to be accessed through an NVMe interface.

In one embodiment, the storage board 100 connects to the storage network 151 through one or more network interfaces 103. Similarly, storage nodes 152 connect to the storage network 151 through one or more network interfaces 103. In one embodiment, network interface 103 can be Ethernet IP or Remote Direct Memory Access (RDMA). In one embodiment, a storage board 100 can communicate with storage boards in other application nodes or servers deployed within the same server rack using high performance low-latency rack interconnect 104. The rack network 104, in one embodiment, may allow the architecture of the present invention to create coherent storage across multiple application nodes as will be explained further below. The high performance interconnect 104 can be a PCIe non-transparent bus, bridge, or multi-root.

In one embodiment, the present invention provides application PAP storage access and tier processing in an optimized storage board dedicated to an application node working in conjunction with any number of storage boards and storage nodes. As compared with traditional storage architectures, where each application node was paired with its own SAN or NAS (e.g., block 5 in FIG. 1), embodiments of the present invention allow each application node, e.g., 150A to 150N to be connected to multiple storage nodes 152. Accordingly, each application node has the ability to retrieve storage data from any of the storage nodes 152 and is not restricted to being paired with any single storage node.

In one embodiment, both storage boards 100 and storage nodes 152 can use methods such as erasure coding, duplicate storing or triple storing to save the same data across multiple storage nodes. For example, erasure coding is a method of data protection in which data is broken into fragments, expanded and encoded with redundant data pieces and stored across a set of different locations, e.g., storage nodes 152. The purpose of using techniques such as erasure coding is to enable data that becomes corrupted at some point in the disk storage process to be reconstructed using information about the data that is stored elsewhere in the array. As a result, the present invention advantageously provides for reliable and secure data storage by allowing the data to be spread across several different storage nodes.

In one embodiment, storage boards 100 can comprise several functional modules, e.g., storage access processing module 106, storage tier processing module 107, storage device management module 108, and cache management module 109. Further, in one embodiment, storage nodes 152 also comprise a storage device management processing module 112 that manages data storage on storage media 155.

Storage Access Processing Module

In one embodiment, each dedicated storage board is configured to perform storage access processing using storage access processing module 106. Generally, the storage access processing module determines how the data gets stored in the storage system. For example, the storage access processing module can be configured to process requests from applications running on the application node, to configure the interface between the storage board and application node, and also to send or receive data from the applications. It can also be configured to create a profile of the application data to determine how to store or retrieve the application data most efficiently. In one embodiment, if specified as policy, the storage access processing module 106 can also be configured to cache data on storage media 105 using industry standard implementations optimized for performance of the media.

Storage Tier Processing Module

In one embodiment, each storage board 100 is also configured to perform storage tier processing using storage tier processing module 107. Generally, storage tier processing performs data storage and ensures that the data is coherently stored and spread (e.g., using erasure coding) across the various attached media and devices. Further, it is responsible for storing data on any one of multiple tiers, e.g., on storage media 105 or storage node 152, whether local or remote.

Storage tier processing module 107, in one embodiment, can store data with ACID (Atomicity, Consistency, Isolation, Durability) semantics reliably as multiple fragments using distributed optimized encoding policies on a tier of storage media (typically either distributed over multiple independent application nodes or multiple independent storage nodes) using a high performance fabric. As explained above, techniques such as erasure coding, for example, in conjunction with a high performance rack network 104 can be used to store the data in a distributed fashion across multiple storage media, e.g., media 105 and nodes, e.g., nodes 152. In one embodiment, the present invention provides hardware acceleration and optimization for the distributed encoding policies.

In one embodiment, storage tier processing module 107 can also retrieve data from data fragments reliably and with low latency using optimized decoding policies from a tier of storage media (typically either distributed over multiple independent application nodes or multiple independent storage nodes) using a high performance fabric. In one embodiment, the storage tier processing module 107 is configured to complete all reads with blocking on pending writes.

Finally, in one embodiment, storage tier processing module 107 can also be used to reliably provide highly available and high performance access to and persistent storage of all metadata required by the storage board to operate autonomously and with ACID semantics.

Storage Device Management Module

In one embodiment of the present invention, storage board 100 can comprise a storage device management module. Further, each storage node can also comprise a storage device management module 112. The storage device management module 108 or 112 can, in one embodiment, store data that is delivered (e.g. written) by storage tier processing module 107 as data fragments on storage board storage media 105 or storage node storage media 155 respectively.

In one embodiment storage device management module 108 or 112 can also be configured to retrieve data requested by the storage tier processing module 107 by reading data fragments from media attached to the storage boards or storage nodes. In one embodiment, module 108 or 112 can also be responsible for discovery and reporting of all the media devices and configuration of media (attached to the storage boards or storage nodes) back to the storage tier processing module 107. Finally, in one embodiment, the storage device management is also responsible for reporting and recovering from media failures on the storage boards or storage nodes.

Cache Management Module

In one embodiment, storage board 100 can comprise a cache management module 109 for implementing the cache specific storage device. For example, module 109 is responsible for implementation of cache reads, cache writes and cache invalidates. Further, it may also be responsible for maintaining low latency coherency of shared storage tier data that is cached across multiple storage boards.

Distributed Storage Protocol

In one embodiment, the present invention provides a distributed storage protocol for transporting data efficiently and reliably across the storage network illustrated in FIG. 3. In one embodiment, the present invention implements a distributed storage tier protocol for interacting with storage device management modules 108 on the various storage boards and storage nodes that are part of the architecture. Further, in one embodiment, the present invention implements a distributed storage coherency protocol for maintaining coherency of a cache distributed across any number of storage boards. In other words, the present invention implements a hardware optimized storage coherency engine keeping cached shared data access across more than one application node coherent using a high performance fabric.

In one embodiment, the distributed storage protocol also keeps track of the storage data fragment format of the data stored by the storage device management module 108 on the storage media including encoding, compression, encryption, and data integrity metadata. Finally, in one embodiment, the protocol also performs software storage versioning to support interoperability of storage tier processing and storage device management software across version implementations and vendors. In other words, embodiments of the present invention provide a distributed storage protocol supporting distributed coherence and encoding, and enabling heterogeneous storage processing version and heterogeneous vendor interoperability.

Finally, in one embodiment, the present invention provides a distributed metadata service that uses the storage tier processing for reliable store and cache management for distributed high-performance access. Also, in one embodiment, the storage devices, e.g., media 105 and 155 can self-configure, manage their own metadata and publish their storage device configuration to the distributed metadata service.

Performing an Application Node Write

Figure 4:
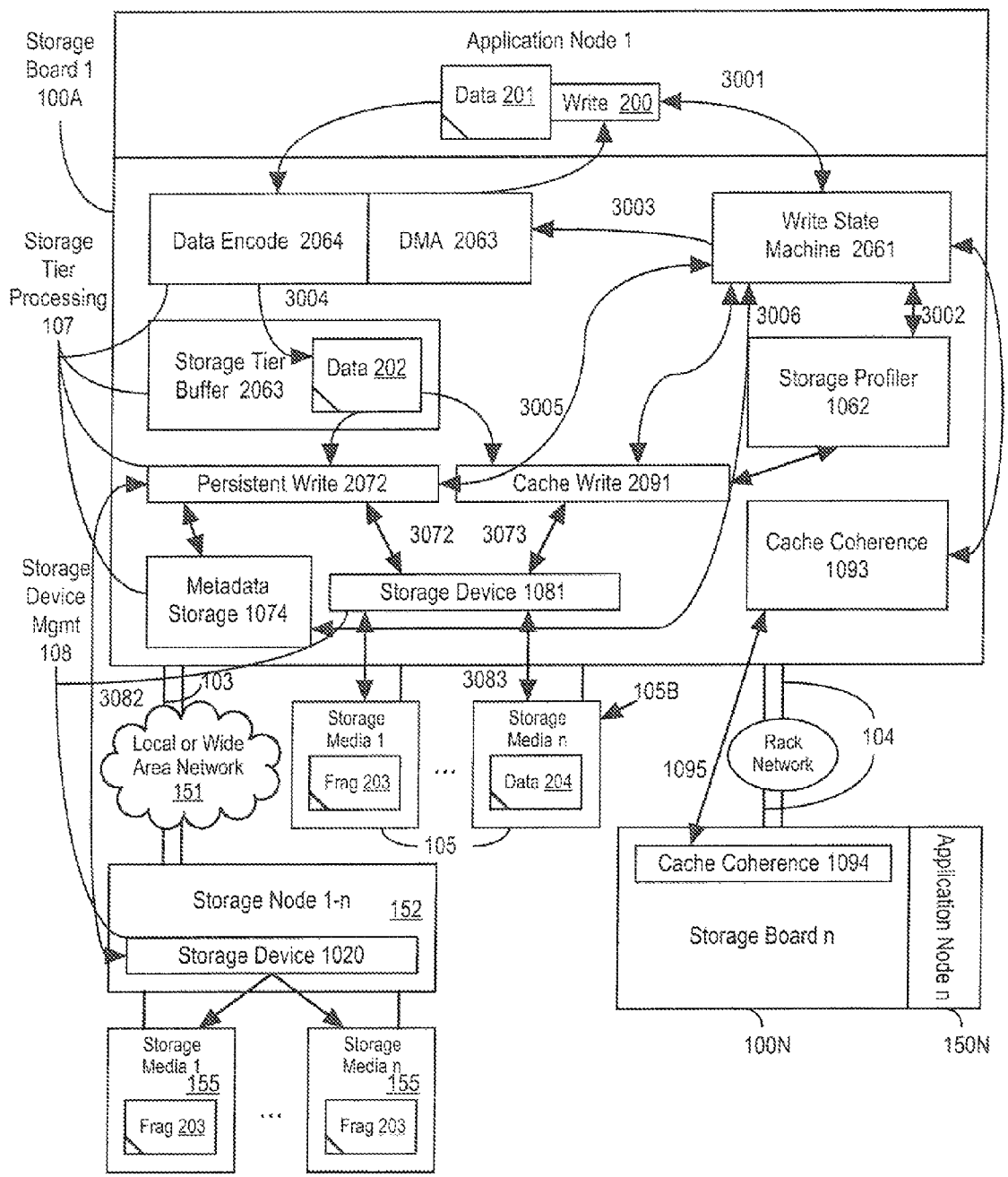
FIG. 4 illustrates a diagram of the timing and manner in which the distributed shared block storage system performs an application node write in accordance with an embodiment of the present invention.

FIG. 4 illustrates the manner in which the distributed shared block storage system performs an application node write in accordance with an embodiment of the present invention. It should be noted that FIG. 4 only illustrates one particular example for performing a write of a data block. Many other variations of the data flow illustrated in FIG. 4 may be possible as well.

As illustrated in FIG. 4, in one embodiment, the functionality of storage access processing module 106 can be partially distributed across the write state machine 2061, the DMA module 2063 and the storage profile 1062. Also, in one embodiment, the functionality of the storage tier processing module 107 can be partially distributed across the data encode module 2064, the storage tier buffer 1071, the metadata service module 1074 and the persistent write module 2072. In one embodiment, the functionality of the cache management module 109 can be partially programmed into the cache write module 2091 and the cache coherence module 1093. Finally, the functionality of the storage device management module 108 can be programmed into the storage device module 1081 or 1020 for managing writes to storage media 105 or 155 respectively.

Initially, as shown in FIG. 4, an application node 150A can request a write 200 of data block 201. The storage access processing module 106 is notified over the interface 101 through pathway 3001. The storage access processing module 106 launches a write state machine 2061. The write state machine 2061 accesses the storage profiler 1062 to determine how to process the write through pathway 3002. The storage profiler 1062, based on policy configuration, determines how the data 201 will be encoded and stored. The storage profiler 1062 returns this information to the write state machine 2061.

The write state machine 2061 launches a Direct Memory Access (DMA) 2063 through pathway 3003 with the policy determined encoding 2064 to transfer the data 201 to the storage tier buffer 1071 in the form of encoded data 202 through pathway 3004. When the DMA 2063 completes transferring the data, the write state machine 2061 invokes a persistent write 2072 for data 202 through path 3005 and, based on the storage profiler policy, a cache write 2091 through path 3006. The persistent write module 2072 distributes the encoded data fragments 203 corresponding to encoded data 202 across a number of separate storage devices, e.g., storage device 1081 in storage board 100A and storage device 1020 in storage node 152 using the distributed storage tier protocol 3072 of the present invention. In one embodiment, the persistent write module 2072 uses the distributed metadata service module 1074 to create a "copy on write lock."

In one embodiment, the data fragments 203 are distributed across the various attached storage media, e.g., media 105 and media 155. In other words, the storage device module 1081 on storage board 100A or the storage device module 1020 on storage node 152 can write the encoded fragments 203 on one or more storage media devices e.g. devices 105 or devices 155 in storage format 3082 as defined by the distributed storage tier protocol 3072. If the write fails the "copy on write lock" is cancelled in the metadata service module 1074.

If the write succeeds and a cache write was determined by the storage profiler 1062 based on the configured policy, the write state machine 2061 invokes cache write module 2091 to store data 204 on one or more storage board attached storage media 105, e.g., media 105B through storage device module 1081 and pathway 3073 and 3083. Subsequently, the write state machine 2061 launches cache coherence module 1093 to reliably update (using directory or snoop) the cache state using the distributed storage coherence protocol 1095 to one or more storage boards, e.g., 100N which participate in the same shared storage tier. The remote cache coherence module 1094 on storage board 100N, for example, receives the cache state from the distributed storage coherence protocol 1095 through rack network 104 and updates the local cache state on the storage board accordingly. The "copy on write lock" is completed when the persistent write module 2072 completes and the cache state is updated. When the necessary operations for guaranteeing the provisioned write policies are completed by the persistent write module 2072, the cache write module 2091, and the cache coherence module 1093, the write state machine 2061 releases the storage tier buffer 1071 and indicates a write complete status to the write request module 200 in the application node 150A.

Performing an Application Node Read

Figure 5:
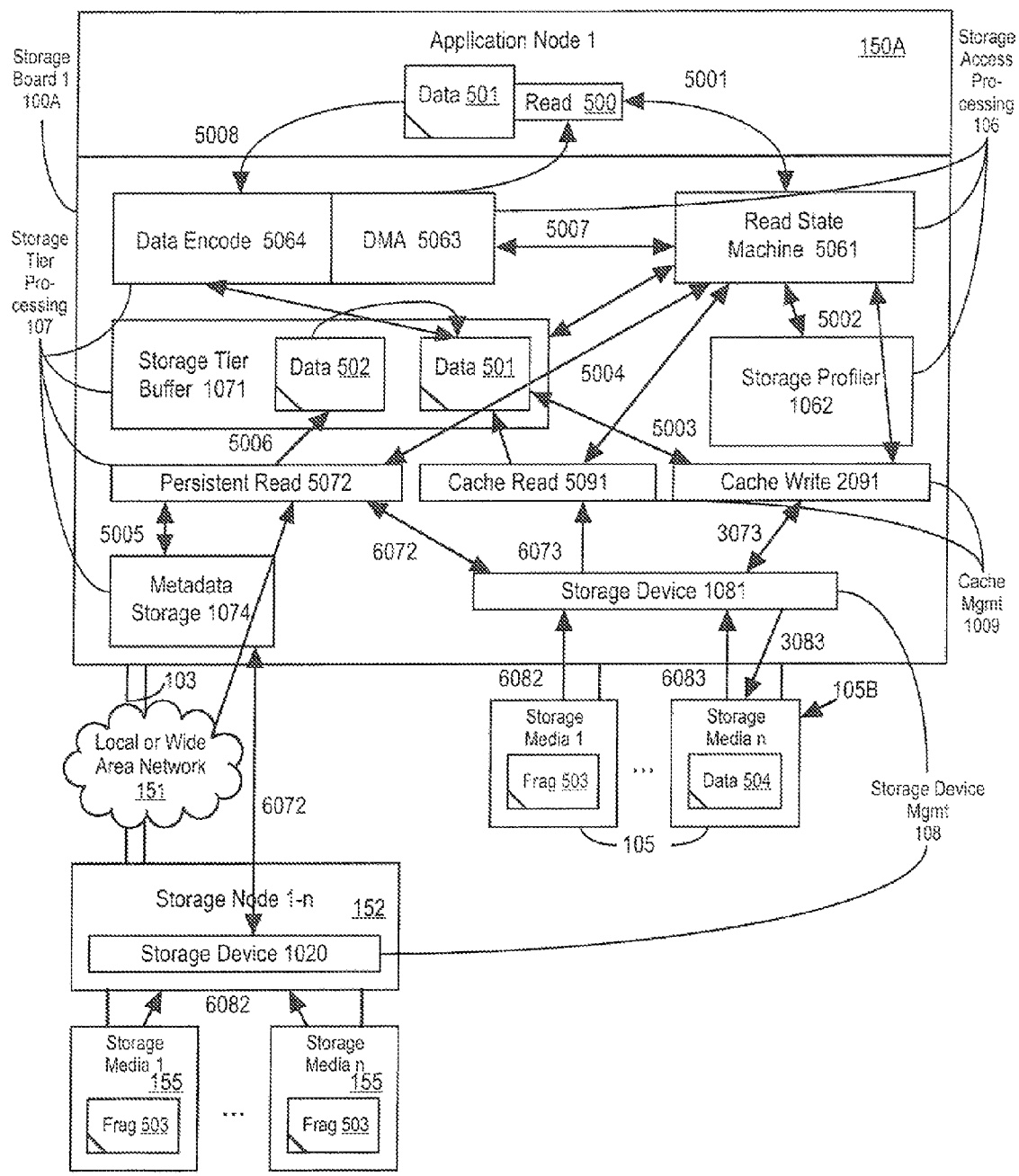
FIG. 5 illustrates a diagram of the timing and the manner in which the distributed shared block storage system performs an application node read in accordance with an embodiment of the present invention.

FIG. 5 illustrates the manner in which the distributed shared block storage system performs an application node read in accordance with an embodiment of the present invention. It should be noted that FIG. 5 only illustrates one particular example for performing a read of a data block. Many other variations of the data flow illustrated in FIG. 5 may be possible as well.

As illustrated in FIG. 5, in one embodiment, the functionality of storage access processing module 106 can be partially distributed across the read state machine 5061, the DMA module 5063 and the storage profiler 1062. Also, in one embodiment, the functionality of the storage tier processing module 107 can be partially distributed across the data decode module 5064, the storage tier buffer 1071, the metadata service module 1074, and the persistent read module 5072. In one embodiment, the functionality of the cache management module 109 can be partially programmed into the cache write module 2091 and the cache read module 5091. Finally, the functionality of the storage device management module 108 can be programmed into the storage device module 1081. In the case of storage node 152, the storage device management module 108 comprises the storage device module 1020.

Initially application node 150A requests a read 500 of data block 501. The storage access processing module 106 can be notified over interface 101 through pathway 5001. The storage access processing module 106 can launch a read state machine 5061. The read state machine 5061 can access the storage profiler module 1062 to determine how to process the read. Based on policy configuration, the storage profiler 1062 determines how the data 501 will be obtained and, if appropriate, cached.

The storage profiler 1062 returns information to the read state machine 5061 over pathway 5002. The read state machine 5061 first determines if the data is already in the cache by requesting a cache read 5091 over pathway 5003. The cache read module 5091 requests data 504 from storage device module 1081, which requests the data from the storage board attached media 105, e.g., 105B via pathway 6073 and 6083 respectively. If the cache read operation returns the data, the read state machine 5061 moves to the "read complete flow" state as will be described below.

If the cache read module 5091 does not return data 504, the read state machine 5061 invokes a persistent read module 5072 over pathway 5004 and locks the cache for the data. The persistent read module 5072 requests the location of the data 503 from the distributed metadata service 1074 through path 5005. The persistent read module 5072 then requests the encoded fragments of data 503 from storage media 105 through the required storage device 1081 using distributed storage tier protocol 6072. Alternatively, persistent read module 5072 can also request the encoded fragments of data 503 from storage media 155 through storage node 152 using distributed storage tier protocol 6072. Both storage device 1081 and storage device 1020 access the fragments 503 from the attached storage media devices (e.g., 105 and 155 respectively) in storage format 6082 and returns the data fragments using the distributed storage tier protocol 6072.

The persistent read module 5072 collects the storage tier protocol encoded fragments 503 and stores the encoded data 502 in a storage tier buffer 1071 through path 5006. Data 502 gets reformatted from encoded format (e.g. erasure coded format) to native coded format 501. If necessary, the storage tier launches a DMA module 5063 to recover lost data fragments and create data 501. If no data fragments 503 were lost, no DMA is performed to construct data 501. When data 501 is available, persistent read module 5072 notifies the read state machine 5061 over path 5004. The read state machine 5061 launches DMA module 5063 over path 5007 with the policy determined decoding 5064 to transfer data 502 to the application node 150A as data 501 over path 5008.

In addition, if the data was not available from the cache read module 5091 and if the policy of the storage profiler 1062 indicates that the read cache should be updated, the read state machine 5061 requests a cache write module 2091 to transmit the data to the storage device module 1081 through pathway 3073, and via the storage device module 1081, to eventually write the data to storage media 105, e.g., media 105B through pathway 3083. When the DMA for data 501 completes, the read state machine 5061 indicates a read complete to the read request module 500 in the application node 150A.

Implementing Shared Namespace Coherence

FIGS. 6A, 6B, 6C and 6D illustrate examples of a state machine used by the storage architecture for implementing shared namespace coherence across multiple nodes.

Figure 6B:
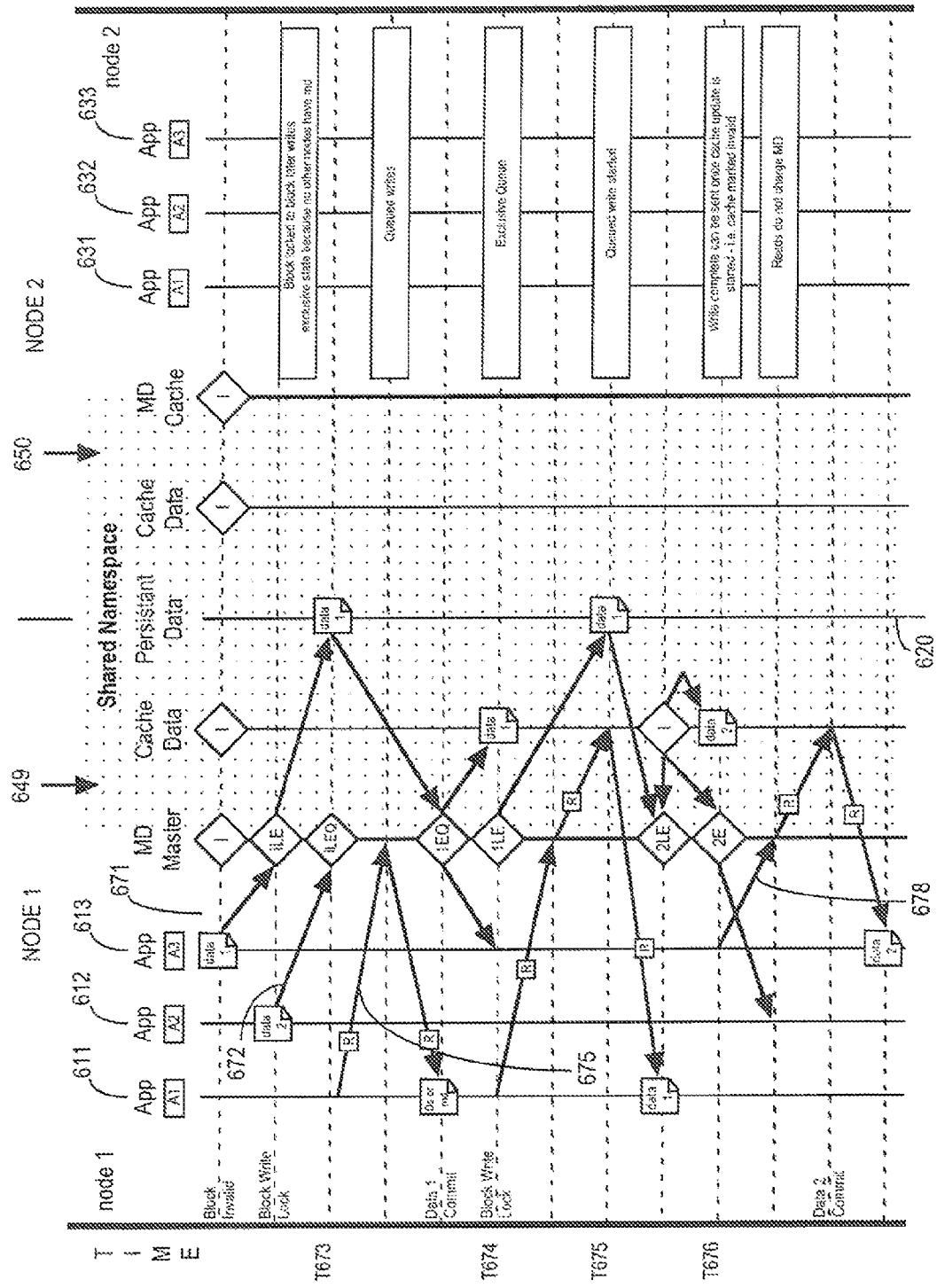
Figure 6C:
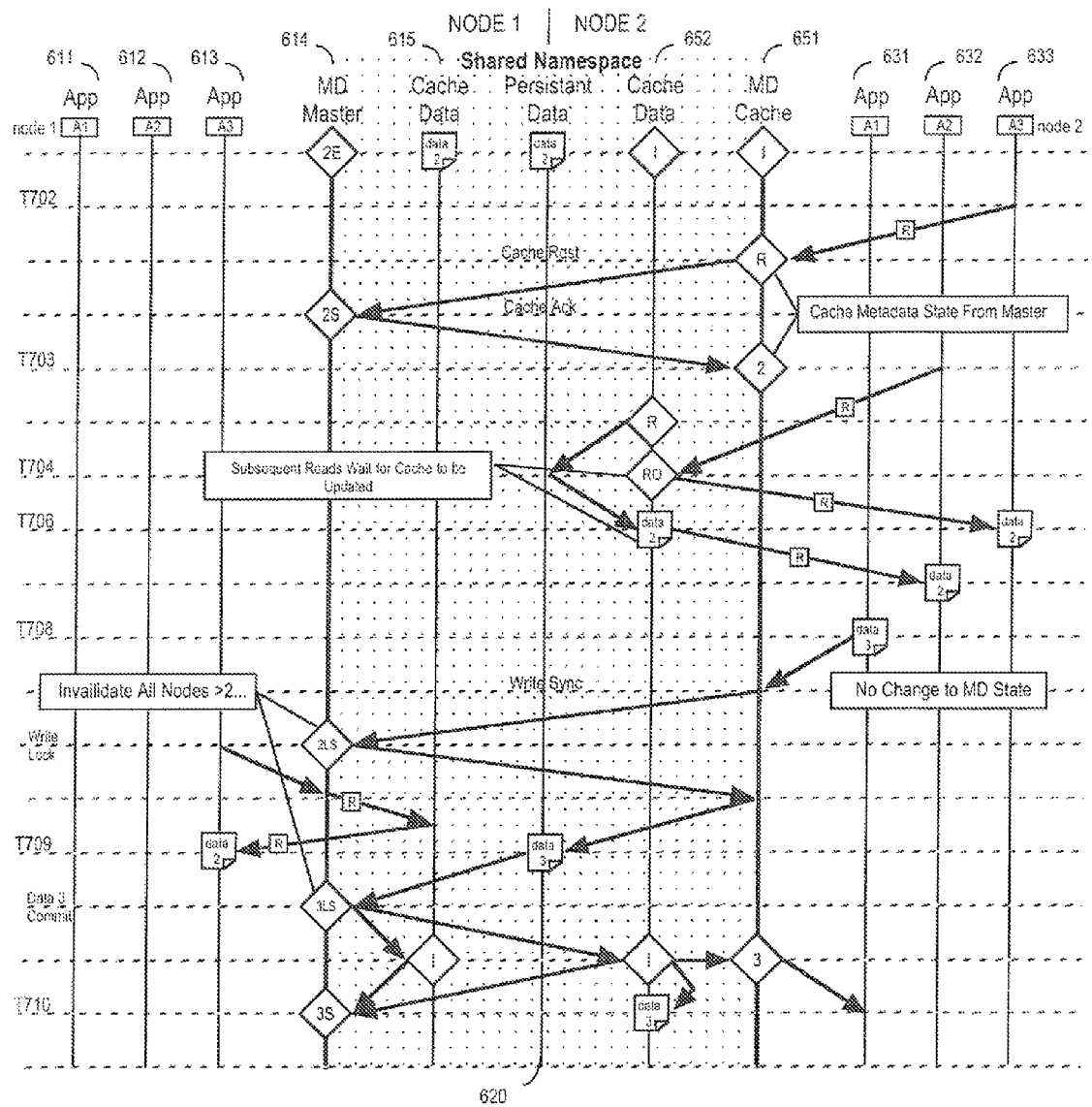
Figure 6D:
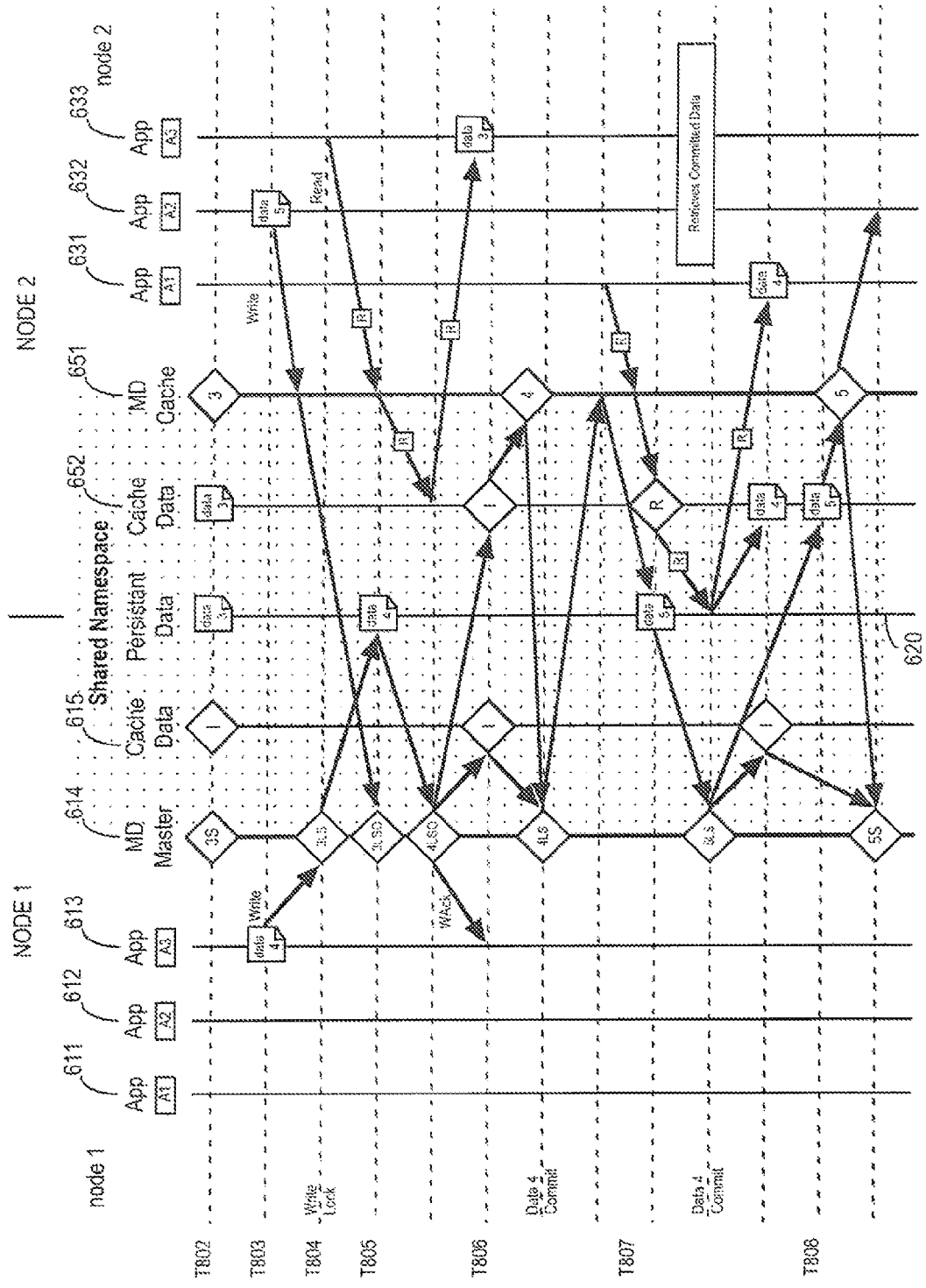

FIG. 6A sets forth a legend used to review the state coupling diagrams of FIGS. 6B to 6D. FIG. 6A shows state data for both the persistent data (master data) and cache data states. All the scenarios shown in FIGS. 6B to 6D assume data is being written as write through cached data. Further, all application writes and reads are shown as going to the same block location to show how the implementation keeps data coherent across the two nodes and multiple applications on each node.

FIGS. 6B to 6D illustrate state coupling diagrams that are implemented across an exemplary two application nodes with three applications running in each node. The horizontal lines represent the manner in which data over time is flowing through the nodes. Further, the vertical lines represent where data is in the two nodes at any given point in time. Arrows representing "read" operations are designated with the label "R". All data is ultimately stored on a persistent data store at 620 (e.g., persistent data write module 2072 and persistent read module 5072). Persistent data 620 is stored on either node 1 or node 2 but is generally accessible across both nodes.

Share name space coherence is implemented by having a state machine keep track of data coherence through the architecture. Data is always maintained on the persistent data store (e.g. 2072 or 5072), which can be attached to either storage board 100 or a storage node 152. The state of the data is maintained in metadata service 1074 (see FIGS. 4 and 5). All nodes are linked to the metadata (MD) master service for a specific shared namespace. All nodes cache data from the persistent store.

FIG. 6B illustrates the manner in which three applications on one node (applications 611, 612 and 613) interact to coherently store data in a single block. Region 649 represents a storage board on node 1 while region 650 represents a storage board on node 2. The metadata master service ensures that the cache and persistent store remain coherent as three independent applications on the node read and write the data. The state of the data maintained in the metadata master service tier 614 and cache data tier 615 are also indicated in FIG. 6B.

As shown in FIG. 6B, initially application A3 attempts to perform a write 671 that is being written out to the external storage board 649. The MD master invalidates all other data, it performs a "copy on write lock" and flags it as an exclusive lock. When data 2 672 is attempted to be written from application A2 612, the MD master queues the write as shown by the MD master state in FIG. 6B ("Q"). Meanwhile, data 1 gets written to persistent data 620 at time T673. Subsequently, data 1 gets committed and written out to the cache at T674. Similarly, following the write to the cache, data 2 gets written to persistent data at T675, and following a write to persistent data, data 1 that was formerly stored in cache data gets overwritten with data 2 at T676 as shown in FIG. 6B.

When application A1 611 attempts a read 675, following the read acknowledgment that is returned (RAck), cache data is read and data 1 is returned back to application A1. Subsequently, when application A3 performs a read 678, the most recent block of data, data 2, is returned. Because data is stored coherently, both the persistent data and cache data get updated with the most updated data being written by any of the applications while the reads always receives the most updated data. Further, as will be shown, in subsequent figures, the data written to the persistent stores and cache can be available across multiple nodes.

FIG. 6C illustrates the manner in which the cache on node 2 is populated from the persistent store created in FIG. 6B. FIG. 6C is a continuation of FIG. 6B, wherein both the cache data 615 and persistent data 620 are initialized with data 2. At time T702 in FIG. 6C, application A1 633 performs a read. The read (from slave node 2) first needs to check the current state of the data at the MD Master 614 and send an acknowledgment back to the local MD Cache 651 in node 2. Subsequently, the local MD Cache 651 accesses the persistent data 620 to retrieve data 2 which is then relayed to application A1 at time T706. At the same time, the local cache data 652 in node 2 is updated so that subsequent accesses by applications in node 2 do not need to access the persistent data. Accordingly, the read generated by application A2 at T703, can access data 2 directly from the local cache data 652.

When application A3 generates a write for data 3 at T708, again, the state of the data at MD Master 614 needs to be checked before the write can be implemented. At step T709, data 3 gets written out to persistent data 620. Subsequently, MD master 614 in node 1 gets updated with the most recent state and at step T710, data 3 gets written to cache data 652 in node 2.

FIG. 6D illustrates the manner in which the cache and persistent store are maintained when two applications are interacting on two different nodes. FIG. 6D is a continuation of FIG. 6C. FIG. 6D starts out at time T802 with data 3 stored in both persistent data 620 and cache data 652 for node 2.

In FIG. 6D, both application A3 613 and application A2 632 attempt to write (data 4 and data 5 respectively) at the same time. Before application A2 632 can perform a write, MD Master 614 first needs to be accessed to determine the correct state and update it if necessary as shown in FIG. 6D. As also shown in FIG. 6D, at step T805, MD Master 614 queues the write from application A2 632. Further, also at step T805, the MD Master 614 updates persistent data 620 with data 4 from application A3 613. However, when a read is performed from application A3 633 at time T804, it returns data 3, because cache data 652 in node 2 has not been updated with data 4 yet. The cache management module ensures that the cache data is synchronized in accordance with the events taking place.

At step T806, the cache data 652 in node 2 is invalidated by the MD Master 614 as a result of the most current write overwriting prior cache data. At step 807, data 5 gets written to persistent data 620 and the status at MD Master 614 is updated. Eventually at step T808, the MD Master 614 also updates cache data 652 with data 5.

Hardware Implementation of the PCIe Interface

Figure 7A:
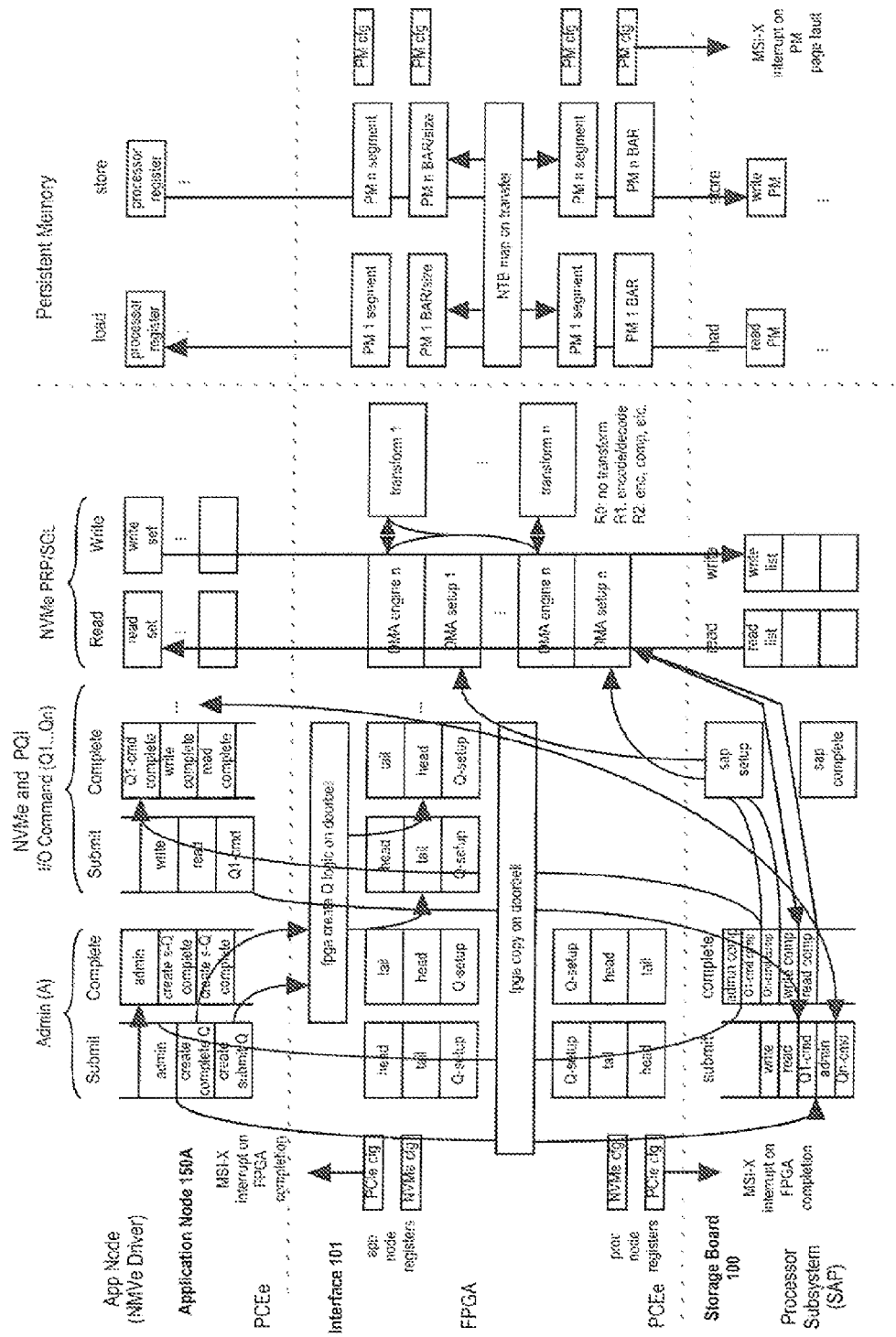
FIGS. 7A, 7B, and 7C illustrate an exemplary FPGA implementation of the interface between the application node and the storage board.
Figure 7B:
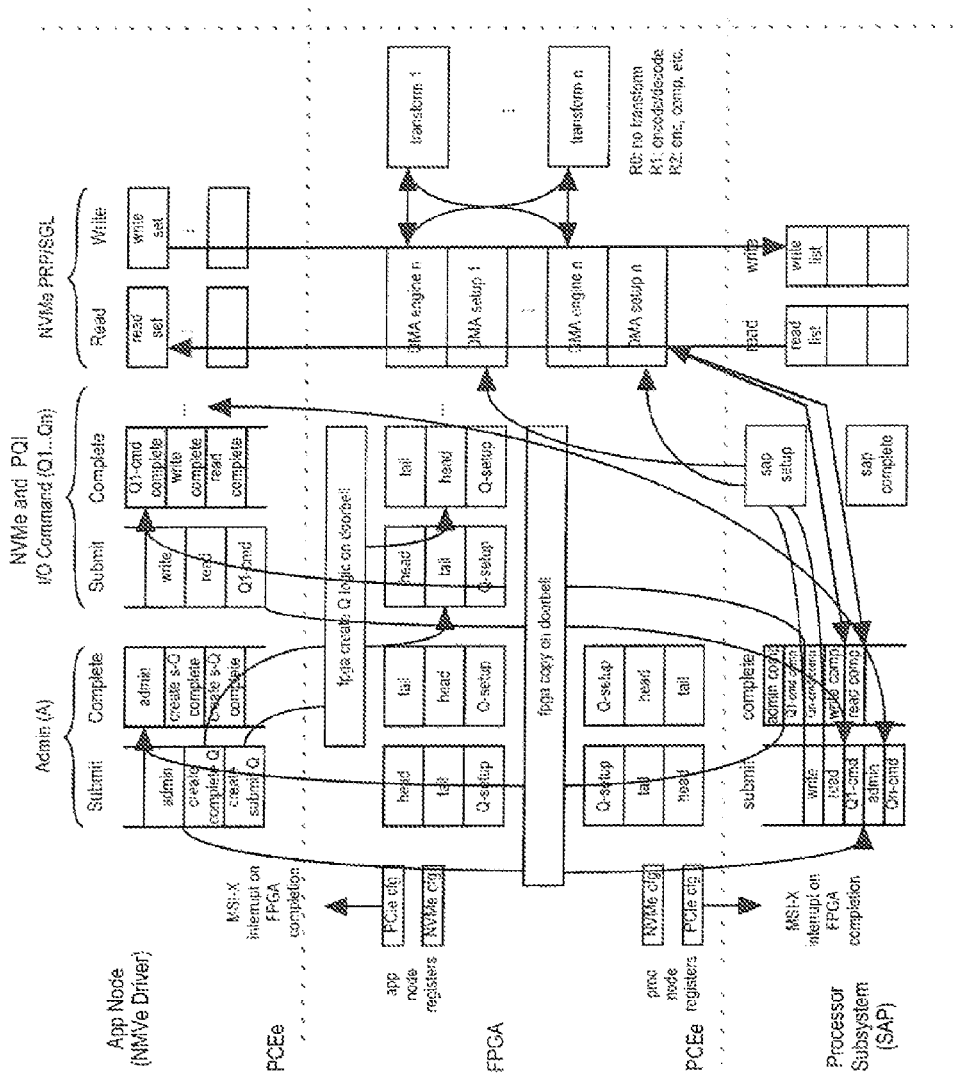
Figure 7C:
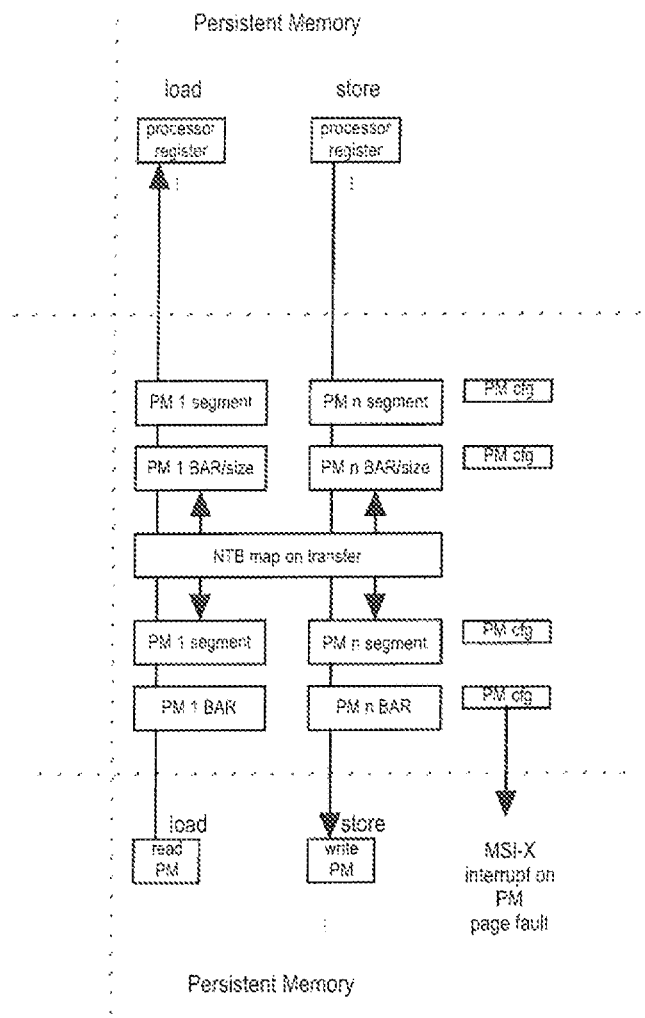

FIGS. 7A, 7B and 7C illustrate an exemplary FPGA implementation of the interface between the application node and the storage board. FIG. 7A illustrates how the interface, e.g., interface 101 between the application node 150A, for example, and storage board 100 is implemented. In one embodiment, the implementation focuses on enabling an application node interface that can interact with a storage solution on the backend. The interface focuses on keeping the NVMe or persistent memory interface coherently synchronized with a system maintaining a combination of persistent memory, solid state storage and hard disk storage. FIG. 7B provides an expanded view of the NVMe interface between the application node and the storage. FIG. 7C provides an expanded view of the persistent memory interface between the application node and the storage.

Implementing the Storage Architecture on a Dedicated Storage Board

Figure 8:
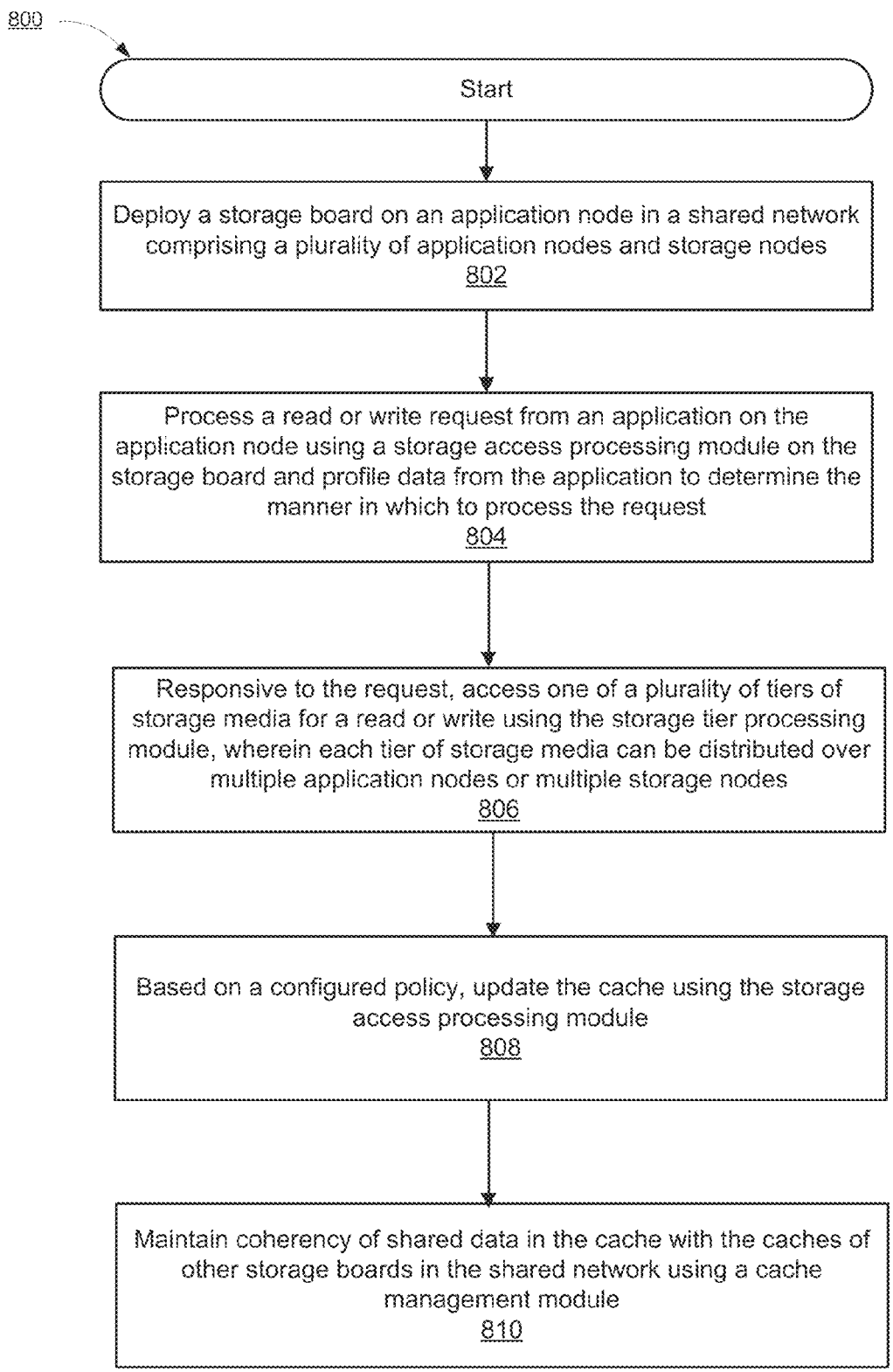
FIG. 8 depicts a flowchart for an exemplary computer controlled process for implementing a storage architecture on a dedicated storage board in accordance with embodiments of the present invention.

FIG. 8 depicts a flowchart for an exemplary computer controlled process for implementing a storage architecture on a dedicated storage board in accordance with embodiments of the present invention.

At step 802, a storage board is deployed on an application node in a shared network comprising a plurality of application nodes and storage nodes, e.g., network 151 in FIG. 3.

At step 804, an incoming request from an application on the application node is processed using the storage access processing module 106, wherein the storage access processing module is configured on the dedicated processor executing on the storage board, and wherein the storage access processing module profiles the application data to determine the manner in which to process the request. The incoming request can be, for example, a request to configure the interface between the storage board and the application node, a request to send data or a request to receive data.

At step 806, responsive to the incoming request, one of a plurality of tiers of storage media is accessed for a read or write using the storage tier processing module 107, wherein each tier of storage media can be distributed over multiple application nodes or multiple storage nodes, and wherein the storage tier processing module can also be configured on the dedicated processor executing on the storage board. As discussed above, in one embodiment, the storage tier processing module stores data with ACID semantics as multiple fragments on a tier of storage media using distributed encoding policies, e.g., erasure coding. In one embodiment, the storage tier processing module can also retrieve data from data fragments reliably using optimized decoding policies.

At step 808, based on a configured policy in the storage profiler 1062, the storage access processing module updates a cache. Finally, at step 810, the cache management module 109 maintains coherency of shared data in the cache with the caches of other storage boards in the shared network, wherein the cache management module can be configured on the dedicated processor executing on the storage board.

Figure 9:
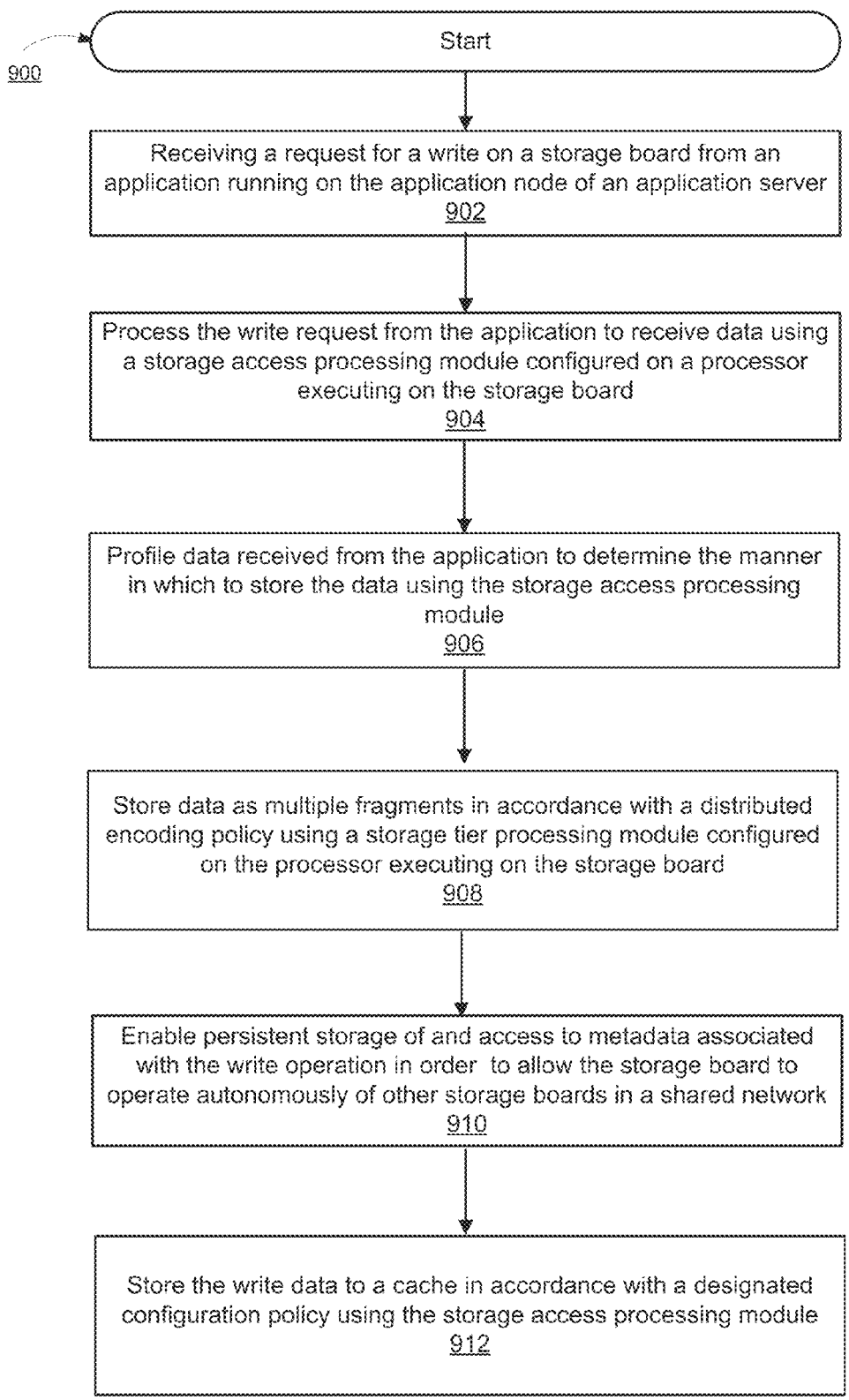
FIG. 9 depicts a flowchart for an exemplary computer controlled process for implementing a write on a storage board in an application server in accordance with embodiments of the present invention.

FIG. 9 depicts a flowchart for an exemplary computer controlled process for implementing a write on a storage board in an application server in accordance with embodiments of the present invention.

At step 902, a request for a write is received by the storage board 100A from an application running on the application node150A of the application server, wherein the application server is part of a shared network comprising a plurality of application nodes and storage nodes.

At step 904, a storage access processing module 106 running on a processor on the storage board processes the write request from the application to receive data. At step 906, the storage access processing module profiles the application data received to determine the manner in which to store the data.

At step 908, a storage tier processing module 107 also running on the processor on the storage board stores data as multiple fragments using distributed encoding policies, e.g., erasure coding on a tier of storage media. At step 910, the storage tier processing module 107 also provides access to and persistent storage of metadata associated with the write operation, wherein the metadata is required by the storage system executing on the processor of the storage board to operate autonomously and with ACID semantics.

At step 912, the storage access processing module, in accordance with a designated policy, can be configured to cache the write data received from the application on the application node on associated storage media.

Figure 10:
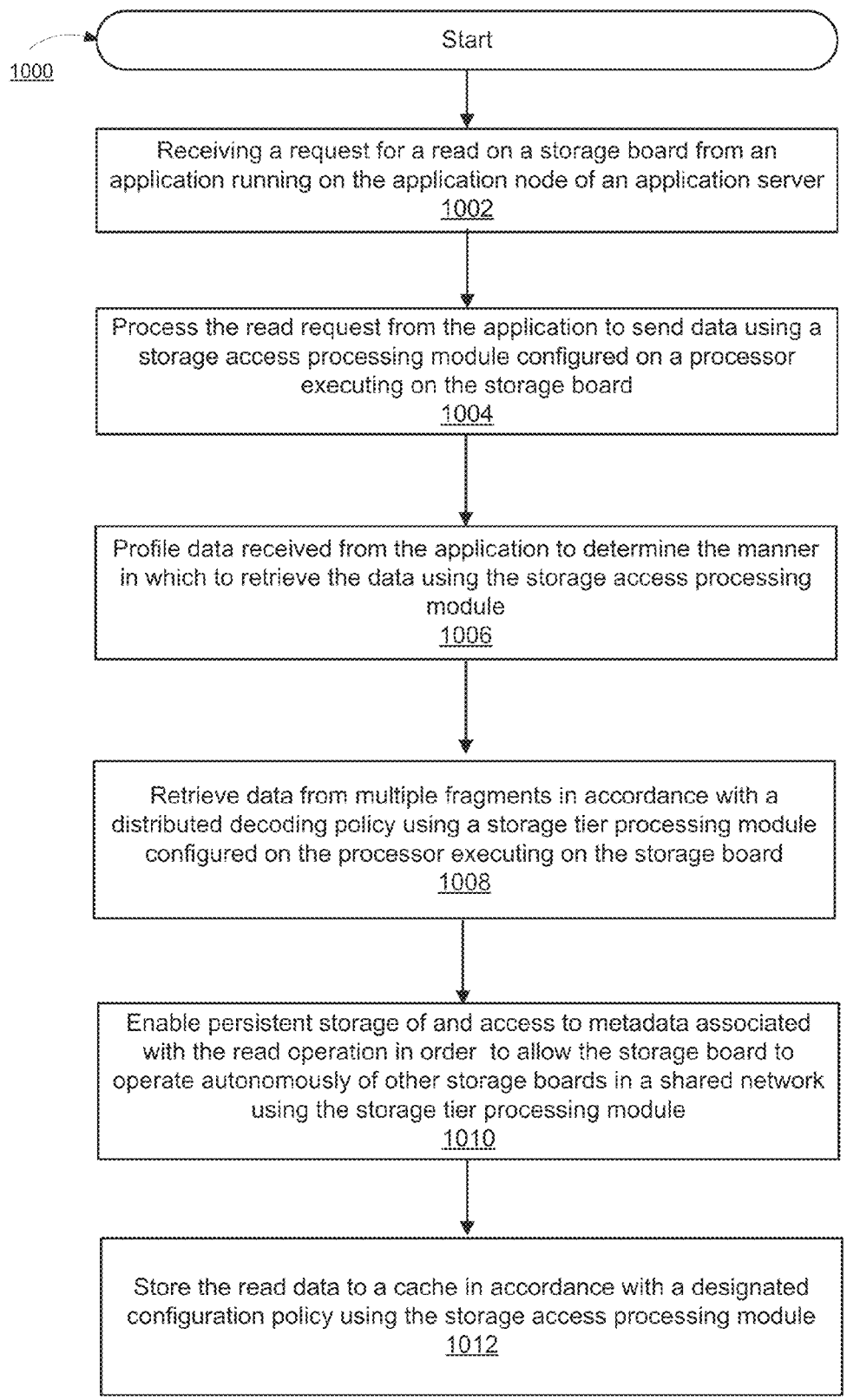
FIG. 10 depicts a flowchart for an exemplary computer controlled process for implementing a read on a storage board in an application server in accordance with embodiments of the present invention.

FIG. 10 depicts a flowchart for an exemplary computer controlled process for implementing a read on a storage board in an application server in accordance with embodiments of the present invention.

At step 1002, a request for a read is received by the storage board 100A from an application running on the application node150A of the application server, wherein the application server is part of a shared network comprising a plurality of application nodes and storage nodes.

At step 1004, a storage access processing module 106 running on a processor on the storage board processes the read request to send data. At step 1006, the storage access processing module profiles the application data received in the request to determine the manner in which to retrieve the data.

At step 1008, a storage tier processing module 107 also running on the processor on the storage board retrieves data from multiple fragments using distributed decoding policies, e.g., erasure coding from a tier of storage media. At step 1010, the storage tier processing module 107 also provides access to and persistent storage of metadata associated with the read operation, wherein the metadata is required by the storage system executing on the processor of the storage board to operate autonomously and with ACID semantics.

At step 1012, the storage access processing module, in accordance with a designated policy, can be configured to cache the read data received from the storage media associated with the persistent read module 5072 to the storage media associated with the cache write module 2091, e.g., storage media 105B.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein.

The foregoing description, for purpose of explanation, has been described with reference to specific embodiments.

However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A method for implementing a storage architecture on a storage board, said method comprising:
enabling said storage board on a first application node of an application server in a shared network comprising a plurality of application nodes and a plurality of storage nodes;
using a storage access processing module, processing a read or write request from an application on said first application node and profiling data transmitted in said request to determine a manner in which to process said request;
using a storage tier processing module, accessing one of a plurality of tiers of storage media to perform a read or write responsive to said request, wherein each tier of storage media is operable to be distributed over multiple application nodes or multiple storage nodes; and
based on a configuration policy, updating a first cache using said storage access processing module and maintaining coherency between shared data in said first cache and caches implemented on respective storage boards in said plurality of application nodes.

2. The method of claim 1, wherein said storage tier processing module and said storage access processing module are configured on a processor executing on said storage board.

3. The method of claim 1, wherein said enabling comprises:
enabling plug and play integration between said storage board and said first application node.

4. The method of claim 3, wherein said enabling further comprises:
enabling plug and play integration between the storage board and a plurality of storage media coupled to said first application node.

5. The method of claim 3, wherein said enabling further comprises:
communicating between said storage board and said first application node using a PCIe interface.

6. The method of claim 5, wherein said PCIe interface supports block and persistent memory storage based on a standard selected from a group consisting of: Advanced Host Controller Interface (AHCI), NVM Express (NVMe), SCSI Express (SCSIe), PCIe G2, PCIe G3, PCIe G3 and SNIA Persistent Memory Architecture.

7. The method of claim 5, wherein said PCIe interface is implemented using a Field Programmable Gate Array (FPGA) device, an integrated Application Specific Integrated Circuit (ASIC) and a standard microprocessor.

8. The method of claim 1, further comprising connecting said storage board to other storage boards in said plurality of application nodes in said shared network using a rack interconnect, wherein said rack interconnect is a non-transparent PCIe bridge.

9. A system for implementing a storage architecture on a storage board, said system comprising:
a storage board enabled on a first application node of an application server in a shared network comprising a plurality of application nodes and a plurality of storage nodes;
a storage access processing module operable to process a read or write request from an application on said first application node and profile data transmitted in said request to determine a manner in which to process said request;
a storage tier processing module operable to access one of a plurality of tiers of storage media to perform a read or write responsive to said request, wherein each tier of storage media can be distributed over multiple application nodes or multiple storage nodes;
a first cache operable to be updated by said storage access processing module based on a configuration policy; and
a cache management module operable to maintain coherency of shared data between said first cache and caches implemented on respective storage boards in said plurality of application nodes.

10. The system of claim 9, wherein said storage access processing module and said storage tier processing module are configured on a processor executing on said storage board.

11. The system of claim 10, wherein said storage tier processing module configured on said processor is further operable to coherently store and access fragmented data on a plurality of storage media, wherein said plurality of storage media is coupled to said plurality of application nodes and said plurality of storage nodes, and wherein said fragmented data is encoded using a distributed encoding policy.

12. The system of claim 9, wherein said storage board is further operable to provide a processing platform for plug and play integration with said first application node.

13. The system of claim 9, wherein said storage board is further operable to provide a processing platform for plug and play integration with a plurality of storage media coupled to said first application node.

14. The system of claim 12, wherein said storage board and said first application node communicate using a PCIe interface.

15. The system of claim 14, wherein said PCIe interface can supports block and persistent memory storage based on a standard selected from a group consisting of: Advanced Host Controller Interface (AHCI), NVM Express (NVMe), SCSI Express (SCSIe), PCIe G2, PCIe G3, PCIe G3 and SNIA Persistent Memory Architecture.

16. The system of claim 14, wherein said PCIe interface is implemented using a Field Programmable Gate Array (FPGA) device, an integrated Application Specific Integrated Circuit (ASIC) and a standard microprocessor.

17. The system of claim 9, wherein said storage board is operable to couple to other storage boards in said plurality of application nodes in said shared network using a rack interconnect, wherein said rack interconnect is a non-transparent PCIe bridge.

18. A microprocessor that implements a storage architecture on a storage board, said microprocessor comprising:
a storage access processing module operable to process a read or write request from an application on a first application node and profile data transmitted in said request to determine a manner in which to process said request, wherein said storage board is enabled on said first application node of an application server in a shared network comprising a plurality of application nodes and a plurality of storage nodes;

a storage tier processing module operable to access one of a plurality of tiers of storage media to perform a read or write responsive to said request, wherein each tier of the storage media is operable to be distributed over multiple application nodes or multiple storage nodes;

a first cache operable to be updated by said storage access processing module based on a configuration policy; and a cache management module operable to maintain coherency of shared data in said first cache with caches implemented on respective storage boards in said plurality of application nodes.

19. The system of claim 18, wherein said storage tier processing module is further operable to coherently store and access fragmented data on a plurality of storage media, wherein said plurality of storage media is connected to said plurality of application nodes and said plurality of storage nodes, and wherein said fragmented data is encoded using a distributed encoding policy.

20. The system of claim 9, wherein said processor on said storage board communicates with said first application node over a PCIe interface and wherein said processor provides a platform for plug and play integration with said first application node.

* * * * *